United States Patent
Schmid et al.

(10) Patent No.: US 6,446,949 B2
(45) Date of Patent: Sep. 10, 2002

(54) WORKPIECE MOUNTING FOR A WORKING MACHINE

(75) Inventors: Hans-Jörg Schmid, Fluor-Wenzeln; Jürgen Merkt, Schramberg, both of (DE)

(73) Assignee: Haas-Laser GmbH & Co. KG, Schramberg (DE)

( * ) Notice: Subject to any disclaimer, the term of this patent is extended or adjusted under 35 U.S.C. 154(b) by 0 days.

(21) Appl. No.: 09/728,139

(22) Filed: Dec. 1, 2000

(30) Foreign Application Priority Data

Dec. 1, 1999 (DE) ....................... 299 20 869 U

(51) Int. Cl.[7] ................................. B25B 1/22
(52) U.S. Cl. ................. 269/71; 269/21; 269/69
(58) Field of Search ............... 269/60, 71, 21, 269/69, 73, 289 R

(56) References Cited

U.S. PATENT DOCUMENTS

| | | | | |
|---|---|---|---|---|
| 2,835,964 A | * | 5/1958 | Yarwood | 269/71 |
| 4,568,070 A | * | 2/1986 | Severt | 269/60 |
| 4,936,559 A | * | 6/1990 | Diaz Torga | 269/69 |
| 5,022,619 A | * | 6/1991 | Mamda | 269/60 |
| 5,243,745 A | * | 9/1993 | Varnau | 269/902 |
| 5,760,564 A | * | 6/1998 | Novak | 269/60 |

* cited by examiner

Primary Examiner—Joseph J. Hail, III
Assistant Examiner—Lee Wilson
(74) Attorney, Agent, or Firm—Lackenbach Siegel Marzullo Aronson & Greenspan

(57) ABSTRACT

A workpiece mounting for a working machine, with a circular mounting plate rotatable in a horizontal plane for chucking a workpiece and with a conveying unit for moving the mounting plate in the horizontal plane, wherein the mounting plate is movable on air support on a horizontal table, and is clampable on the conveying unit in any desired rotational position.

8 Claims, 3 Drawing Sheets

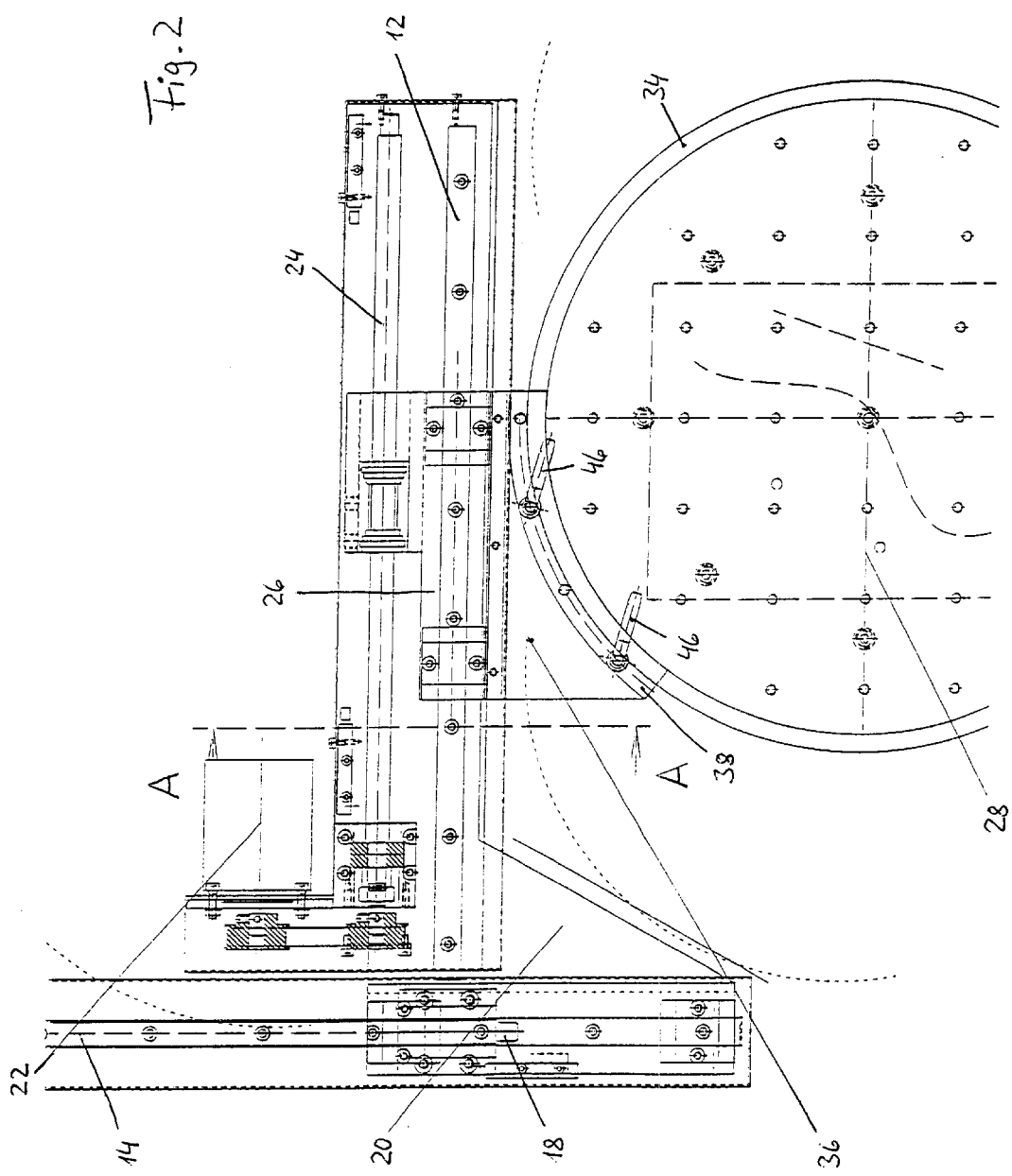

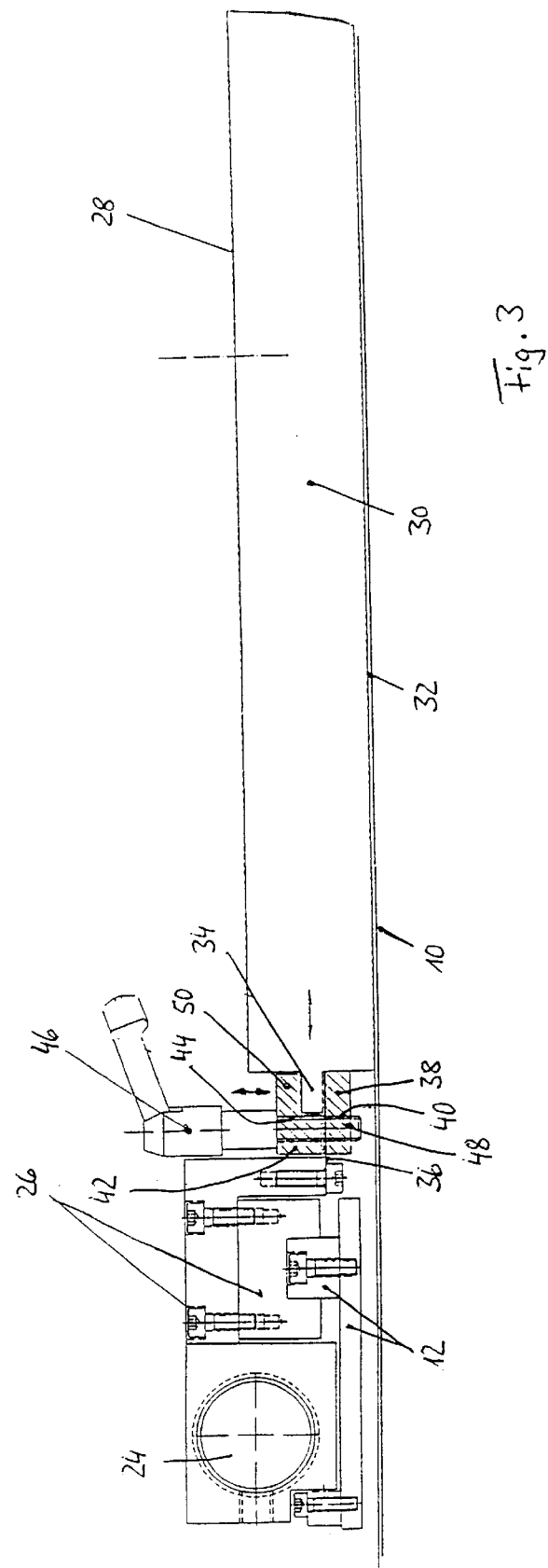

WORKPIECE MOUNTING FOR A WORKING MACHINE

BACKGROUND OF THE INVENTION

1. Field of the Invention

The invention relates to a workpiece mounting for a material removal working machine according to the preamble of claim 1.

2. Description of the Prior Art

In working machines, such as, for example, drilling and milling machines and in particular laser working machines, the workpiece is chucked onto a workpiece mounting for the working. In order to position the workpiece with respect to the working tools, or with respect to the laser beam, and to generate the working advance, it is known to chuck the workpiece onto a circular mounting plate which is supported rotatably in a horizontal plane and is movable in this horizontal plane by means of a conveying unit. The mounting plate is herein supported rotatably by means of a pivot bearing which is attached on the conveying unit and is moved by means of it. In order to be able to work heavy work pieces, a corresponding high loading capacity of the mounting plate and its pivot bearing is necessary. The bearing is therefore constructionally expensive and has a high weight. Accordingly, the conveying unit, which is conventionally movable in the X and Y axes, must be laid out to be highly loadable.

Such expensive workpiece mountings are justified for series productions. The cost of working of single workpieces, for example the laser working of injection molding form tools, however, is excessively increased due to such workpiece mountings.

SUMMARY OF THE INVENTION

The invention is therefore based on the task of providing a workpiece mounting which is constructed cost-effectively and also is suitable for heavy workpieces.

This task is solved according to the invention through a workpiece mounting with the characteristics of claim 1.

Advantageous realizations of the invention are specified in the dependent claims.

The essential concept of the invention comprises chucking the workpiece onto a mounting plate, which, air-supported on a horizontal table surface, is freely movable, in particular can also be rotated about its vertical axis. In the desired rotary position the mounting plate is clamped on the conveying unit. The conveying unit is preferably formed of two linear guidances such that the mounting plate clamped on the conveying unit can be moved under control in the X and Y direction by means of the conveying unit.

Based on the air support of the mounting plate on the table surface, the mounting plate is movable free of friction even if heavy workpieces, of, for example, up to 200 kg are chucked. With the clamping disengaged, the mounting plate can be moved, in particular also be moved manually, on the table surface. The mounting plate can in particular also be rotated in order to orient the chucked workpiece in the X and Y directions of the linear guidances of the conveying unit. After rotating the mounting plate for angular positioning, the mounting plate is clamped on the conveying unit. The linear advance in the X direction and the Y direction for the working can now be carried out by means of the conveying unit. Since the mounting plate is air-supported, it can be moved free of friction by the conveying unit such that the conveying unit only needs to apply low displacement forces even with heavy workpieces. The conveying unit can therefore be laid out simply and cost-effectively.

Depending on the requirements, the linear guidances of the conveying unit can be driven by motor or manually, wherein, in the case of a motor drive, a joy stick control or also a CNC control can be used.

In a useful implementation the mounting plate is clamped at its circumference on the conveying unit. For this purpose the mounting plate can comprise a circumferential flange, which is grasped by a clamping device of the conveying unit. A simple implementation is obtained thereby that the conveying unit comprises a circular-arc form seat, which extends under the circumferential flange of the mounting plate, wherein clamping means, for example, in the form of clamping jaws, clamp the circumferential flange securely on this seat.

BRIEF DESCRIPTION OF THE DRAWINGS

In the following the invention will be explained in further detail in conjunction with an embodiment example depicted in the drawing. Therein show:

FIG. 2 an enlarged partial representation of FIG. 1, and

FIG. 3 a vertical section along line A—A in FIG. 2.

DETAILED DESCRIPTION OF THE INVENTION

Figure 1:
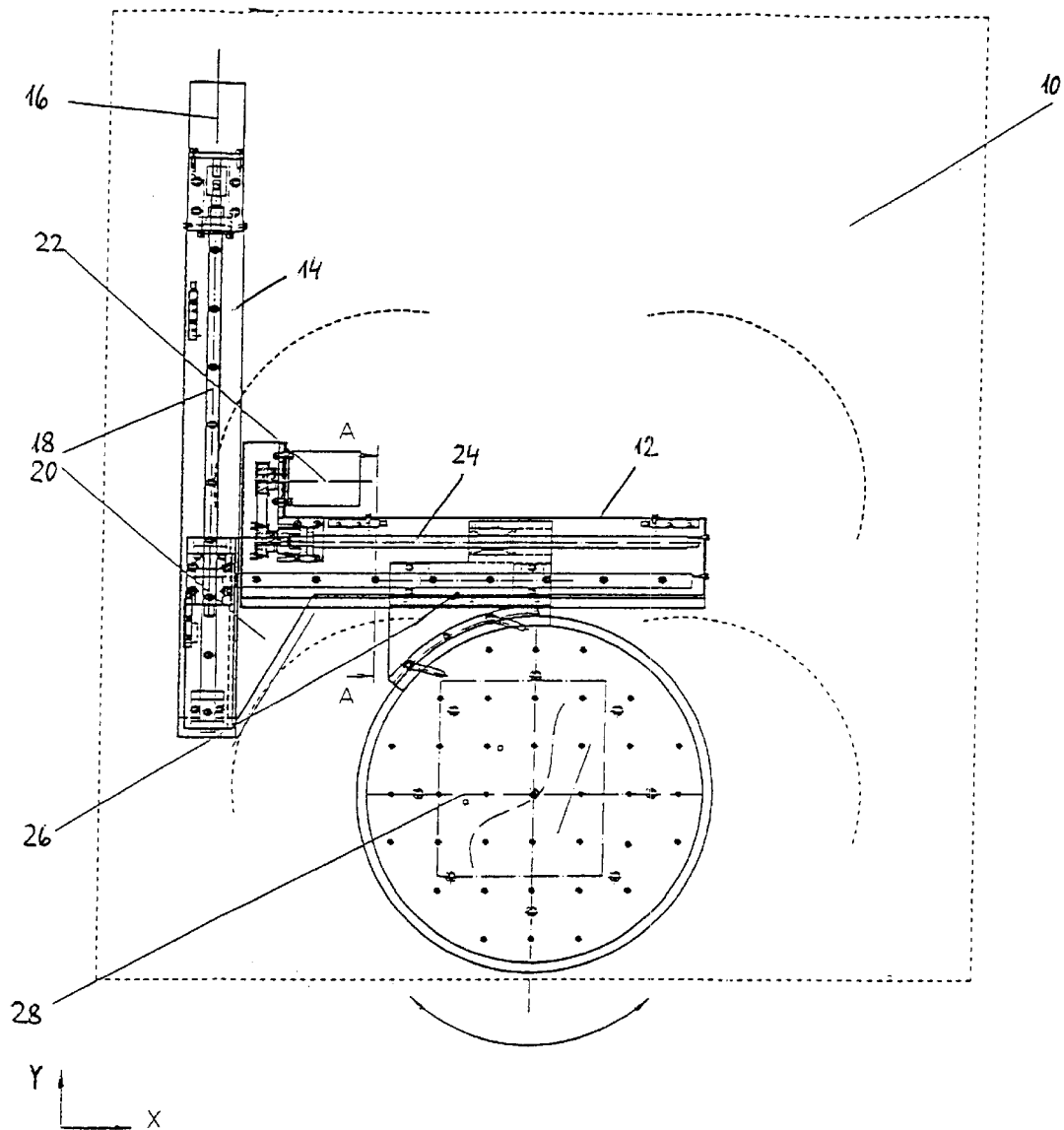
FIG. 1 a top view onto the workpiece mounting.

The embodiment example shows a workpiece mounting for a laser working machine. In particular with this working machine heavy workpieces can be worked. The working machine can be used, for example for the purpose of eliminating and reworking by means of laser beams defects in injection mold form tools.

Underneath the conventional laser beam generator and focusing unit, not shown in the drawing, is disposed a horizontal table surface 10. The table surface 10 is produced of metal sheets adhered one to the other under pressure and comprises a planarity of better than 0.1 mm.

On the table surface 10 is disposed an X-Y conveying unit, which comprises an X linear guidance 12 and a Y linear guidance 14. The Y linear guidance 14 comprises a positioning drive 16 fixed on the table surface 10, which comprises an electric motor and a position sender serving for feed back. The positioning drive 16 drives via a spindle 18, for example a ballscrew, a linearly guided Y carriage 20. The Y carriage 20 carries a positioning drive 22, which also comprises an electric motor and a position sender for reporting-back. The positioning drive 22 drives via a spindle 24, for example a ballscrew, a linearly guided X carriage 26. Due to the linear guidances 12 and 14 disposed at right angles to one another, the X carriage can be moved via the positioning drives 16 and 22 with coordinate control on the plane of the table surface 10. The coordinate control can take place via a joy stick, if an individual manual positioning of the workpiece to be worked is desired. A coordinate control via a programmable CNC control is also possible.

The linear guidances 12 and 14 are structured in a manner known per se such that a detailed description is not required.

For chucking the workpiece a circular mounting plate 28 is provided which has a diameter adapted to the application purpose, for example a diameter of approximately 350 mm. The mounting plate 28 carries at its top side a pattern of apertures known per se which serves for inserting chucking means for the workpiece to be chucked. Formed on at the circumference of the mounting plate 28 is a margin 30 directed downwardly, into which is set a base of a porous sintered aluminum plate. Via a (not shown) connection line and a controllable magnet valve, air under pressure, for example at a pressure of approximately 3 bar, is introduced into the hollow body formed by the mounting plate 28 and the base. This air emanates through the porous base over its entire surface and forms an air cushion which bears the mounting plate 28 with an air gap 32 of up to approximately 0.2 mm between the table surface 10 and the base, or the lower edge of margin 30. If the compressed air is introduced under the mounting plate 28, the mounting plate 28 is supported in this way through the air cushion and is mounted freely floating and thus free of friction. At an air consumption of approximately 17 l/min at a pressure of 3 bar, a bearing force of the mounting plate 28 is obtained of, for example, up to 200 kg. If the air supply is switched off via the magnet valve, the mounting plate 28 becomes deposited with its margin 30 on the table surface 10 and is seated immovably and securely.

When the air cushion under the base of the mounting plate 28 is built up, the mounting plate 28, due to its friction-free air support, can readily be displaced manually on the table surface 10 and be rotated about its vertical axis. By rotating the mounting plate 28, in this way a workpiece chucked on the mounting plate 28 can be aligned, in particular in its angular position, such that the axes of the workpiece correspond to the X and Y axes of the linear guidances 12 and 14.

As soon as the mounting plate 28 is manually aligned, it is clamped on the X-Y conveying unit in order to be securely connected with it. For this purpose the mounting plate 28 comprises at the outer circumference approximately at half the height of its margin 30 a flange 34 extending over the entire circumference and projecting radially outwardly. On the X carriage 26, displaceable on the X linear guidance 12, is fastened a metal connection sheet 36 projecting parallel to the plane of the table surface 10. The metal connection sheet 36 is, as evident in FIG. 3, bolt-connected with the X carriage 26 and projects from it. On the outer edge facing away from the X carriage 26, of the metal connection sheet 36 is fastened a seat 38 on the underside of the metal connection sheet 36, which has the form of a circular arc segment with the radius of the mounting plate 28. If the mounting plate 28 while being air supported is slid against the seat 38, the seat 38 extends under the flange 34 of the mounting plate 28 and comes to rest on the outer circumference of the margin 30. Outside of the outer circumference of flange 34 are provided in the seat 38, offset angularly with respect to one another in the circumferential direction, two threaded bores 40. Onto the metal connection sheet 36 are set clamping jaws 42 in such position that a vertical continuous bore 44 of the clamping jaw 42 is axially aligned with one of the threaded bores 40 of the seat 38. Clamping levers 46 are each inserted with a threaded bolt 48 through the bores 44 and screwed into the threaded bores 40. The clamping levers 46 are each seated on the clamping jaws 42, in order to tension these axially against the seat 38. Each of the clamping jaws 42 comprise a jaw segment 50, which extends over the flange 34 and is in contact on the outer circumference of margin 30. If the mounting plate 28 is slid with its flange 34 against the seat 38, such that it extends beneath the flange 34, the jaw segments 50 are set on the flange 34. By tightening the clamping levers 46, the jaw segments 50 are tensioned against the flange 34 such that this flange 34 and, consequently, the mounting plate 28 is clamped on the seat 38 and is securely connected with the X carriage via the metal connection sheet 36.

Through the clamping the mounting plate 28 is attached torsionally tight on the X carriage and thus on the conveying unit. Via the positioning drives 16 and 22 the mounting plate 28 can be moved under control in the X and Y direction.

The metal connection sheet 36 has sufficient elasticity in the vertical Z direction, perpendicular to the plane of the table surface 10, such that the mounting plate 28 can move vertically over the height of the air gap 32 without a force being transmitted in the Z direction onto the X-Y conveying unit.

The present invention having been herein described in reference to a preferred embodiment thereof, it will be apparent to one skilled in the art that various changes and modifications may be made to this invention without departing from the scope of the following claims.

What is claimed is:

1. A workpiece mounting for a working machine comprising a mounting plate rotatable in a horizontal plane for chucking a workpiece, a conveying unit for moving the mounting plate in the horizontal plane, and an air support means for supporting the mounting plate on air above a horizontal table surface, wherein the mounting plate is clampable on the conveying unit in any desired rotational position.

2. The workpiece mounting as claimed in claim 1, wherein the conveying unit comprises two linear guidances perpendicular with respect to one another.

3. The workpiece mounting as claimed in claim 1, wherein the mounting plate can be clamped with its outer circumference on the conveying unit.

4. The workpiece mounting as claimed in claim 3, wherein the mounting plate comprises a flange at its outer circumference, which is grasped by a clamping means of the conveying unit.

5. The workpiece mounting as claimed in claim 4, wherein the clamping means comprises a circular-arc form seat and clamping jaws cooperating with it, and wherein the flange of the mounting plate is clampable between the seat and the clamping jaws.

6. The workpiece mounting as claimed in claim 1, wherein the mounting plate is connected with the conveying unit via connection means which are elastically resilient in the direction perpendicular to the table surface.

7. The workpiece mounting as claimed in claim 6, wherein the connection means comprise a metal connection sheet, surface-parallel with the table surface, which is connected with the conveying unit and carries the clamping means.

8. The workpiece mounting as claimed in claim 1, wherein the air support means comprises a circumferential margin on the mounting plate directed toward the table surface, into which at the table surface side a porous base is set, wherein air under pressure is introduced through the base and between the base and the table surface to form an air cushion supporting the mounting plate.

* * * * *